Figure 1:
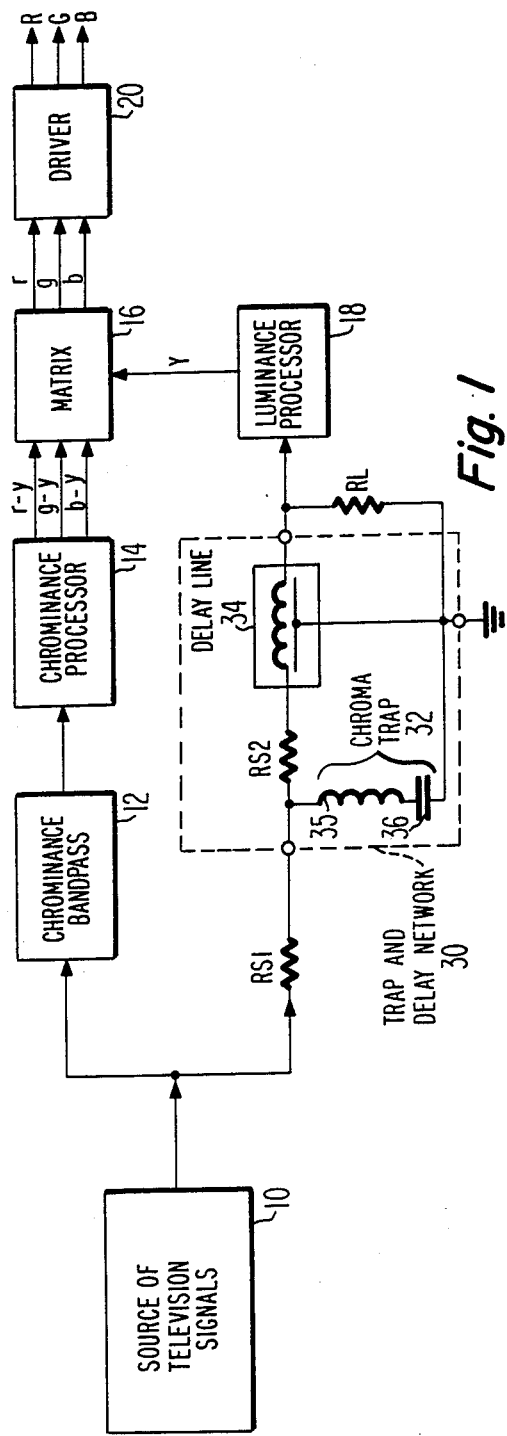

United States Patent [19]

Bell

[11] Patent Number: 4,677,462
[45] Date of Patent: Jun. 30, 1987

[54] DELAY AND FILTER NETWORK WITH CHROMINANCE TRAP BETWEEN SERIES INPUT RESISTORS

[75] Inventor: Isaac M. Bell, Indianapolis, Ind.
[73] Assignee: RCA Corporation, Princeton, N.J.
[21] Appl. No.: 795,869
[22] Filed: Nov. 7, 1985
[51] Int. Cl.$^4$ .................... H04N 9/77; H04N 9/64; H04B 1/10
[52] U.S. Cl. .................................. 358/39; 358/31; 307/520
[58] Field of Search ................... 358/39, 31, 38; 307/520; 328/167

[56] References Cited

U.S. PATENT DOCUMENTS

| 3,578,901 | 5/1971 | Griepentrog | 358/39 |
| 3,728,476 | 4/1973 | Bates et al. | 358/31 |
| 4,309,719 | 1/1982 | Hinn | 358/39 |

FOREIGN PATENT DOCUMENTS 1319215  6/1973  United Kingdom .

OTHER PUBLICATIONS

Service Data Bulletin for RCA Color Television Receiver Chassis CTC-118.
Exhibit A, showing Schematic Circuit Diagram of Delay Line Circuit No. DLC 1606, Available from TDK Corporation of Japan.

Primary Examiner—James J. Groody
Assistant Examiner—Robert Michael Bauer
Attorney, Agent, or Firm—P. J. Rasmussen; P. M. Emanuel; R. H. Kurdyla

[57] ABSTRACT

In a luminance channel of a color television receiver, a luminance signal is conveyed to the input of a delay line via first and second series connected source resistors. A series tuned trap tuned to the chrominance subcarrier frequency is coupled between the junction of the first and second resistors and a point of reference potential. The coaction of the first and second source resistors and the trap results in a significant reduction in frequency dependent source impedance variations at the input of the delay line.

6 Claims, 2 Drawing Figures

DELAY AND FILTER NETWORK WITH CHROMINANCE TRAP BETWEEN SERIES INPUT RESISTORS

This invention concerns a video signal processing network exhibiting signal filtering and delaying functions. In particular, this invention concerns a network, in a color television receiver for processing luminance and chrominance video signal components, for trapping (nulling) the chrominance component at the input of a luminance signal delaying circuit.

In a conventional color television receiver, the luminance and chrominance components of a baseband composite video signal are processed in separate channels before being combined in a matrix circuit to produce plural color image representative signals as known. The chrominance signal processing channel exhibits a much narrower frequency bandwidth compared to the bandwidth of the luminance signal processing channel. As a result of this difference in bandwidth, the chrominance signal at the output of the chrominance channel is delayed in time relative to the luminance signal at the output of the luminance channel. The delay between the luminance and chrominance signals must be eliminated before the luminance and chrominance signals are combined in the matrix circuit, since it is necessary for the luminance and chrominance signals to exhibit proper timing synchronism when combined to assure that output color image signals from the matrix circuit are properly constituted.

The described luminance signal delay is customarily compensated for by means of a wide bandwidth, linear phase delay circuit such as a luminance delay line included in the luminance channel. The delay line is resistively terminated in its characteristic impedance at both input and output ends to prevent unwanted reflections of the luminance signal from the ends of the delay line. A band reject filter which acts as a chrominance trap usually precedes the luminance delay line to prevent the chrominance signal from being conveyed to the luminance channel.

In one known, widely used configuration of a luminance delay line and chrominance trap, the trap is a parallel tuned inductor-capacitor network coupled in series between a luminance signal source and the input of the luminance delay line. This configuration undesirably exhibits a widely varying frequency dependent source impedance at the input of the delay line as the frequency of the wideband luminance input signal varies about the frequency to which the trap is tuned. The varying impedance at the input of the delay line leads to an impedance mismatch at the delay line input, with attendant luminance signal reflections from the ends of the delay line. The signal reflections can lead to significant degradation of a displayed video image such as by creating secondary images, or "ghosts", in a displayed image.

The impedance variations (mismatch) at the input of the luminance delay line and the problems created thereby are reduced significantly by a trap and delay circuit configuration in accordance with the principles of the present invention. In a disclosed implementation of a trap and delay circuit pursuant to the present invention, the source impedance at the input of a luminance delay line includes first and second resistive elements with a total value related to the characteristic impedance of the delay line. A chrominance signal trap is coupled between the junction of the first and second resistive elements and a point of reference potential.

Figure 2:
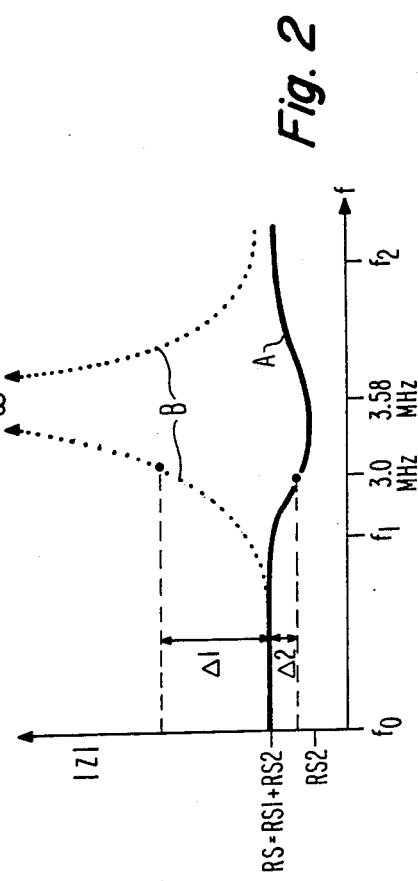

In the drawing:

FIG. 1 shows a portion of a color television receiver including a luminance trap and delay line configuration in accordance with the principles of the present invention; and FIG. 2 illustrates an impedance versus frequency response characteristic helpful in understanding the operation of the trap and delay line configuration of FIG. 1.

In FIG. 1, a composite baseband television signal from a source 10, including luminance and chrominance signal components, is coupled to a chrominance signal processing channel including a chrominance bandpass network 12 which selectively conveys the chrominance component to a chrominance signal processor 14 of conventional design for producing r-y, g-y and b-y color difference signals. The color difference signals are combined in a matrix amplifier 16 with a processed luminance signal Y from a luminance processor 18 for producing low level color image representative video signals r, g and b. These color signals are amplified by a display driver stage 20 which provides output high level color image signals R, G and B suitable for driving an image display device such as a kinescope.

The signal from source 10 is also coupled to a luminance signal processing channel including a chrominance trapping and luminance delaying network 30 and luminance processor 18. The luminance signal in this example exhibits a bandwidth of from zero Hertz to slightly above 3.0 MHz, which is significantly wider than the chrominance signal bandwidth of 3.58 MHz±0.5 MHz.

Network 30, which may be constructed as a monolithic encapsulated circuit, includes a wideband luminance delay line 34 which exhibits a substantially linear phase characteristic over the luminance signal bandwidth. Delay line 34 may be of the glass or inductor-capacitor type, for example. The output of delay line 34 is terminated in its characteristic impedance by means of a load resistor RL. Resistors RS1 and RS2 represent the luminance signal source resistance with respect to the input of delay line 34. The value of resistor RS1 includes the value of a coupling resistor as illustrated, plus the value of a driving source resistance at the output of source 10, e.g.; the low output resistance of an output emitter follower transistor. The input of delay line 34 is terminated by means of resistors RS1 and RS2, the combined value of which substantially equals the characteristic impedance of delay line 34.

Network 30 also includes a band reject filter 32 including series resonant inductor 35 and capacitor 36 coupled between the junction of resistors RS1 and RS2 in the luminance signal path and a point of reference potential (ground). Filter 32 is tuned to the 3.58 MHz chrominance subcarrier frequency and acts as a chrominance trap to prevent the chrominance component from being conveyed to the luminance channel including delay line 34 and processor 18.

FIG. 2 illustrates the frequency dependent source impedance variations at the input of delay line 34.

In FIG. 2, response A depicts the source impedance (Z) variation with frequency (f) for the disclosed arrangement of source resistors RS1 and RS2 with trap 32. The source impedance varies from a maximum value RS, corresponding to the sum of the values of resistors RS1 and RS2, at lower luminance signal frequencies between frequencies $f_0$ and $f_1$, and at higher luminance signal frequencies greater than a frequency $f_2$. The source impedance declines over an intermediate frequency range between frequencies $f_1$ and $f_2$, reaching a minimum value corresponding to the value of source resistor RS2 at the 3.58 MHz frequency to which trap 32 is tuned. The range of source impedance variation, between the combined values of resistors RS1 and RS2 and the value of resistor RS2, produces an acceptably small impedance mismatch at the input of delay line 34.

For the purpose of comparison, a response B in FIG. 2 depicts the frequency dependent source impedance variation of a known chrominance trap and luminance delay line arrangement which employs a source resistor and a parallel tuned trap tuned to 3.58 MHz coupled in series between a video signal source and a luminance delay line. In such known arrangement, as employed in RCA color television receiver chassis CTC-118 for example, the source impedance variations are extreme, ranging from the value of the source resistance (RS) at lower luminance frequencies to infinity at the 3.58 MHz trapping frequency, as indicated by response B. Over a luminance signal passband from frequency $f_0$ (zero Hertz) to a frequency of 3.0 MHz, the known arrangement exhibits a source impedance variation $\Delta 1$, which is significantly greater than a source impedance variation $\Delta 2$ exhibited by the illustrated arrangement in accordance with the present invention over the same passband.

Because of the reduced source impedance variation exhibited by the disclosed arrangement, the amplitude of mismatch induced luminance signal reflections through delay line 34 is reduced significantly. Also, any signals reflected from trap 32 toward load resistor RL are conducted via resistor RS2 and are attenuated by a factor of 1+RS2/RL. These properties of the disclosed arrangement greatly reduce the amount of signal reflections produced by impedance mismatch at the input of the delay line, thereby reducing degradation of a displayed image due to secondary images, or "ghosts". In addition, both the amplitude and duration of video image degrading signal "ringing" induced by impedance mismatch at the delay line input are significantly reduced by the more uniform impedance matching at the input of the delay line of the disclosed arrangement.

The choice of the values of resistors RS1 and RS2 depends upon the requirements of a particular system. A small value of resistor RS1 causes trap 32 to exhibit reduced trapping depth. If the value of resistor RS2 is reduced, reflected luminance signals through delay line 34 will be attenuated less. Thus the choice of values for resistors RS1 and RS2 involves a compromise between a desired trapping depth and a permissible amplitude of reflected luminance signals.

What is claimed is:

1. In a video signal processing system including a luminance channel for processing a luminance signal and a chrominance channel for processing a chrominance signal including a chrominance subcarrier component, apparatus comprising
   signal delaying means having an input and an output;
   luminance signal processing means for receiving delayed signals from said output of said signal delaying means;
   source resistance means including first and second resistors connected in series for coupling said luminance signal to said input of said signal delaying means; and
   filter means coupled from a junction of said first and second resistors to a point of reference potential for trapping said chrominance signal so as to attenuate said chrominance signal at said input of said signal delaying means.

2. Apparatus according to claim 1, wherein
   said signal delaying means is a delay line; and
   said first and second resistors have a combined value of resistance related to the characterisitc impedance of said delay line.

3. Apparatus according to claim 1, wherein
   said filter means is tuned to the frequency of said chrominance subcarrier.

4. Apparatus according to claim 1, wherein
   said filter means comprises a series tuned reactive circuit.

5. In a system for processing a broadcast type television signal containing a luminance signal component and a chrominance signal component having a subcarrier component, apparatus comprising
   signal combining means having a chrominance signal input and a luminance signal input, for combining a delayed version of said luminance signal component and said chrominance signal component;
   signal delaying means having an input for receiving said luminance signal component, and an output for providing said delayed version of said luminance signal component to said luminance signal input of said combining means;
   source resistance means including first and second resistors connected in series for coupling said luminance signal component to said input of said signal delaying means; and
   chrominance signal trapping means comprising a series tuned reactive network coupled from a junction of said first and second resistors to a point of reference potential, for attenuating said chrominance signal component at said luminance signal input of said signal delaying means.

6. Apparatus according to claim 5, wherein
   said trapping means is tuned to the frequency of said chrominance subcarrier component.

* * * * *